United States Patent [19]

Andrew

[11] Patent Number: 4,473,600
[45] Date of Patent: Sep. 25, 1984

[54] CATALYTIC CONVERTER WITH FLUID INJECTOR FOR CATALYST-FREE ENCLOSURE OF CATALYST BED

[75] Inventor: Sydney P. S. Andrew, Hartlepool, England

[73] Assignee: Imperial Chemical Industries PLC, London, England

[21] Appl. No.: 363,382

[22] Filed: Mar. 29, 1982

[30] Foreign Application Priority Data

Apr. 23, 1981 [GB] United Kingdom ............... 8112587

[51] Int. Cl.³ .............................. B01J 8/02; B01J 8/04
[52] U.S. Cl. .................................... 422/218; 422/192; 422/194; 422/195; 422/207; 422/220
[58] Field of Search ............... 422/218, 193, 194, 192, 422/195, 220, 139, 140, 148, 176, 181, 207; 239/426, 434, 428, 431, 429

[56] References Cited

U.S. PATENT DOCUMENTS

| | | | |
|---|---|---|---|
| 2,632,692 | 3/1953 | Korin et al. | 422/194 X |
| 3,458,289 | 7/1969 | King et al. | 422/148 |
| 3,466,152 | 9/1969 | Yamamoto et al. | 422/194 X |
| 3,694,169 | 9/1972 | Fawcett et al. | 422/220 X |
| 3,784,361 | 1/1974 | Kubeg et al. | 422/194 X |
| 4,230,670 | 10/1980 | Forseth | 422/207 X |
| 4,347,221 | 8/1982 | Zamma et al. | 422/207 |

FOREIGN PATENT DOCUMENTS

1914247 10/1970 Fed. Rep. of Germany ...... 422/148

*Primary Examiner*—Barry Richman
*Assistant Examiner*—William R. Johnson
*Attorney, Agent, or Firm*—Cushman, Darby & Cushman

[57] ABSTRACT

A fluid injection lozenge comprises two tubes supporting a perforate member forming a cage enclosing the space between the tubes. Each tube has a series of perforations along its length so that a fluid can be injected, through the tube, into the enclosed space. The lozenges are of use in catalytic converters of either the axial or radial flow design. In the case of a radial flow converter, a plurality of tubes are provided, preferably connected in pairs by the perforate members, to form a squirrel cage structure, disposed in the catalyst bed.

7 Claims, 6 Drawing Figures

CATALYTIC CONVERTER WITH FLUID INJECTOR FOR CATALYST-FREE ENCLOSURE OF CATALYST BED

This invention relates to apparatus for injecting a fluid into a stream of fluid passing through a bed of particulate material.

In many catalytic processes a stream of a fluid, e.g. a gas or mixture of gases, is continuously passed through a bed of catalyst particles. It is often desirable to mix the fluid stream with a further fluid as it passes through the bed: the further fluid may be a further quantity of the original fluid fed to the bed or may be chemically dissimilar thereto. Thus in order to obtain a desired temperature profile in the bed, a further quantity of the original fluid at a suitable temperature may be injected into the fluid stream flowing through the bed.

For example, in an exothermic reaction, such as ammonia or methanol synthesis, the fluid, e.g. synthesis gas, becomes hotter as it flows through the catalyst bed. Injection of a further quantity of the fluid at a lower temperature provides a cooling effect thus enabling a more uniform temperature profile to be maintained through the bed. Conversely, in an endothermic process, injection of a further quantity of the fluid treated to a higher temperature may be desirable.

One arrangement for introducing the further quantity of fluid is described in U.S. Pat. No. 3,458,289 and comprises a perforate tube, to which the further quantity of fluid is supplied, surrounded by a cage of, for example, expanded metal, situated at the desired position in the catalyst bed. The cage thus provides a catalyst-free space in the bed and is of such dimensions that a substantial proportion of the fluid flowing through the catalyst bed flows through the cage wherein it is mixed with the further quantity of the fluid supplied from the perforate tube.

This type of fluid injection apparatus has been used in converters for ammonia production of the axial flow type. In those converters, the cage is of annular form and is often referred to as a lozenge. In some cases there may be lozenges disposed at intervals along the length of the converter so that fresh synthesis gas is introduced into the catalyst bed at different locations. Also, where the converter is of large internal diameter, at any given fluid injection location two lozenges may be positioned, one concentrically disposed within the other, so that the catalyst-free space provided by the interior of the lozenges extends over a large proportion of the width of the catalyst bed.

As mentioned above, the lozenge forms a catalyst-free space surrounding a perforate tube. The cage enclosing the catalyst-free space is made from expanded metal or a wire mesh held in spaced relationship from the perforate tube by spacing plates disposed at intervals along the perforate tube. While this construction is satisfactory for axial flow converters, it has not heretofore been used in transverse flow, e.g. radial flow, converters. We have now devised a single "lozenge" construction that is suitable for both transverse and axial flow converters.

Accordingly we provide fluid injection apparatus for use in a catalyst bed comprising two tubes disposed with their longitudinal axes a substantially constant distance apart and a perforate catalyst-restraining means supported by the tubes forming a cage enclosing the space between said tubes, each tube having a series of perforations along its length extending from the tube interior to said enclosed space, and means to supply fluid to the interior of said tubes.

One advantage offered by the present invention over the previously described lozenge construction is that of improved mixing of the injected fluid with the fluid stream entering the cage from the catalyst bed. This is because the injected fluid is injected into the enclosed space from the tubes in at least partially opposed directions. This gives rise to a particularly turbulent region within the cage where the injected fluid also meets the fluid stream from the catalyst bed.

In an axial flow converter, the tubes will thus be in the form of a pair of concentric annuli and so similar to the lozenge construction hereinbefore described but with two tubes supporting the cage instead of a single tube disposed within the cage and held spaced therefrom by spacer plates. If the convertor is a vertical axial flow converter, in order that the catalyst can be changed without leaving a residual pile of catalyst on top of the cage, the upper surface thereof is preferably convex: the apex of the cage may be supported by a member concentric with the two tubes but displaced vertically therefrom. This member may be a third tube to which the fluid may be supplied, in which case it should have a series of perforations along its length connecting its interior with the space enclosed by the cage. In section the three tubes thus form the corners of a triangle: the triangle preferably has an apex angle of less than 90°.

In a transverse flow converter, the tubes will extend along the length of the converter through substantially the whole depth of the catalyst bed with the tubes substantially parallel to one another. Generally a transverse flow converter will be constructed to provide flow of the fluid radially outwards from the centre of the vessel. In order to provide that a substantial part of the fluid stream flowing radially outwards through the catalyst bed encounters a fluid injection device, a plurality of the latter may be disposed at intervals round the circumference of a circle enclosing the inner part of the catalyst bed. Thus the fluid injection devices form a squirrel cage-like structure around the core of the vessel. While a first perforate catalyst restraining means may be disposed round all of the exterior cylindrical surface of the squirrel cage of tubes, and a second perforate catalyst restraining means may be disposed round all of the interior of said squirrel cage of tubes, thus providing an annular enclosed space through which the fluid must pass on its way radially outwards through the catalyst bed, it is preferred that the tubes are connected in pairs, on the interior and exterior cylindrical surfaces of the squirrel cage by the perforate catalyst restraining means. In this way space is left for catalyst particles to pass from the interior of the squirrel cage to the exterior thereof, or vice versa, through the spaces between the connected pairs of tubes. This enables an even level of catalyst to be maintained during use (where variation in bed height may otherwise occur due to bed settlement) and during charging and discharging the catalyst. The spaces between the connected pairs of tubes should however be such that a substantial proportion, and preferably substantially all, of the fluid from the bed flows into the catalyst-free spaces rather than between the connected pairs of tubes.

Therefore further in accordance with the present invention we provide a radial flow converter comprising means to contain a catalyst bed, inlet and outlet means for a first fluid disposed such that said first fluid flows radially through the catalyst bed, and injection apparatus of the above described squirrel-cage type disposed within the catalyst bed for injecting a second fluid, or a further quantity of the first fluid, into the first fluid as it flows radially through the catalyst bed.

The invention is further illustrated by reference to the accompanying drawings wherein.

Figure 1:
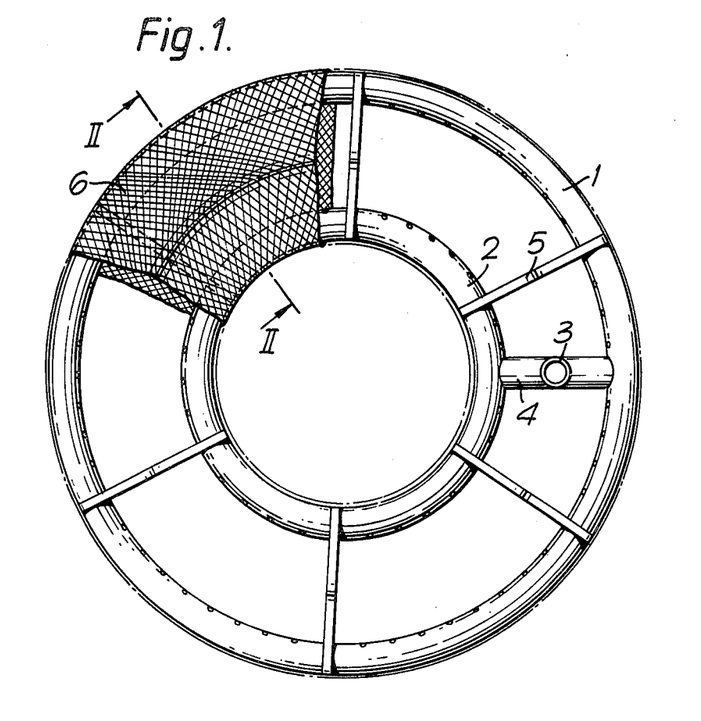
FIG. 1 is a part cut away plan view of a fluid injector for an axial-flow converter.
Figure 2:
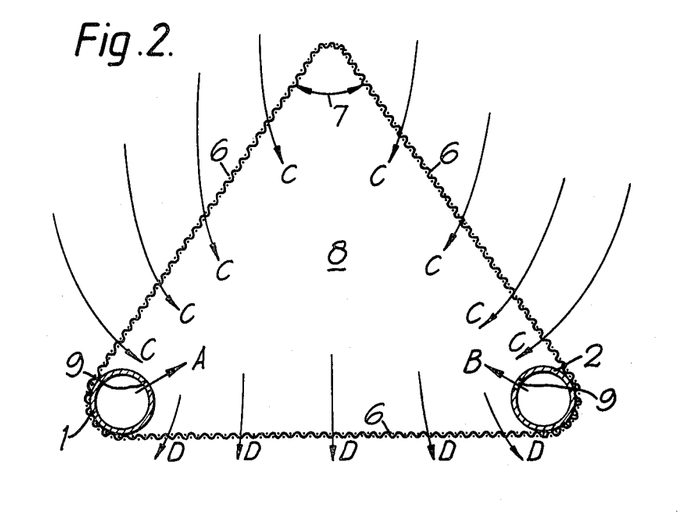
FIG. 2 is a section along the line II—II of FIG. 1.

Referring to FIGS. 1 and 2, an injector for use in an axial-flow converter, e.g. of the type described in U.S. Pat. No. 3,458,289, is shown. The fluid injector comprises a pair of tubes 1,2 disposed as a pair of concentric annuli. A fluid supply tube 3 supplies fluid to each tube 1,2 via a connecting branch 4. Supported by tubes 1, 2, and by plates 5 disposed at intervals around the annuli, is a mesh 6 forming a perforate catalyst-restraining means.

The mesh 6 thus forms a cage, having an apex angle 7 of less than 90°, enclosing a space 8 free of catalyst into which fluid may be injected from tubes 1, 2 via perforations 9 disposed at intervals along the length of the tubes. The fluid issues through perforations 9 in the direction of arrows A, B which are thus at least partially opposed thus creating a region of turbulence within space 8. Fluid enters space 8 from the catalyst bed in the direction of arrows C and becomes intimately mixed with the fresh fluid injected through perforations 9 before leaving the space 8 in the direction of arrows D through the mesh 6 forming the base of space 8.

Figure 3:
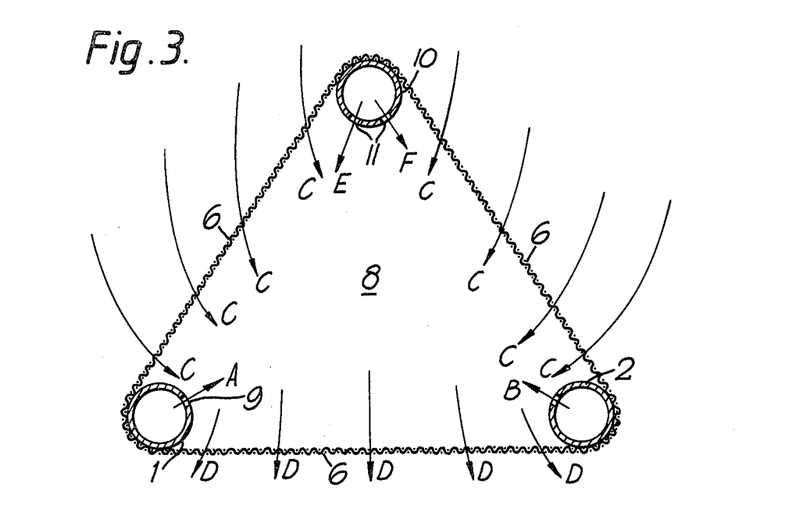
FIG. 3 is a view similar to FIG. 2 showing an alternative embodiment.

In FIG. 3, an alternative arrangement is shown wherein the mesh 6 is supported at its apex by a third perforate tube 10. Fluid is supplied to tube 10 from the supply tube by a further branch tube, not shown, and issues from tube 10 via perforations 11 therein in the direction of arrows E and F which are thus at least partially opposed to the directions of arrows A and B.

The fluid injection devices of FIGS. 1 to 3 may be used as the injectors in the axial-flow converter of U.S. Pat. No. 3,458,289, i.e. in place of the injector system 22, 24 described therein.

Figure 4:
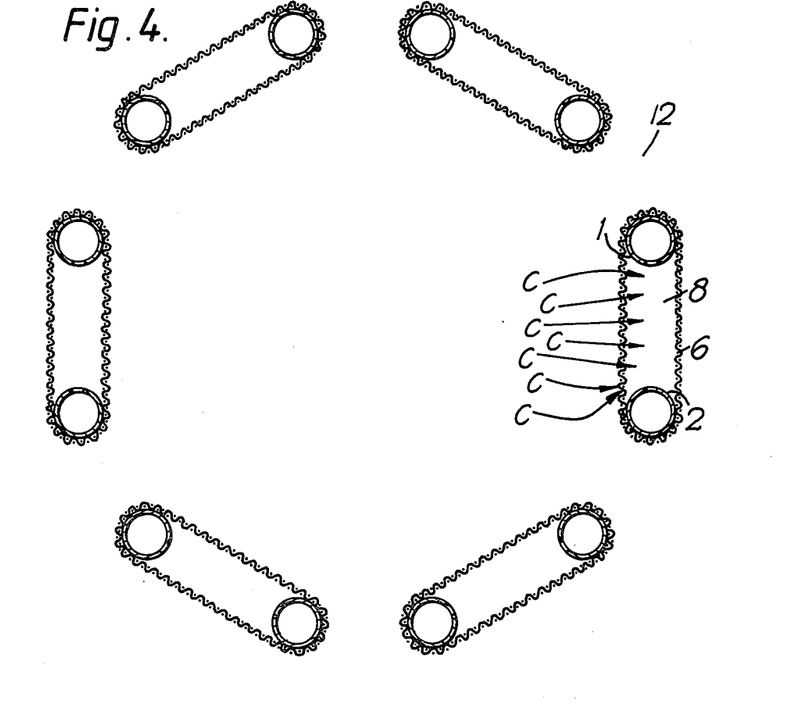
FIG. 4 is a cross section of an assembly of fluid injectors for use in a radial-flow converter.

In FIG. 4 a fluid injection arrangement for use in a radial-flow converter is shown. Here several pairs of tubes 1,2 are arranged at intervals around the circumference of a circle thus forming a squirrel cage-like arrangement. Each pair of tubes 1,2 supports a catalyst restraining mesh 6 thus enclosing a space 8 between the tubes 1,2 of each pair. Tubes 1,2 are perforate so that fluid can be injected therefrom into the enclosed spaces 8. The spaces 12 between adjacent pairs of tubes are small in relation to the enclosed spaces 8 so that the fluid flowing radially, e.g. outwards, through the catalyst bed within the squirrel cage tends to flow into the enclosed catalyst-free spaces 8 rather than through the catalyst containing spaces 12 between adjacent pairs of tubes 1,2. The fluid flow thus tends to be in the direction of arrows C.

Figure 5:
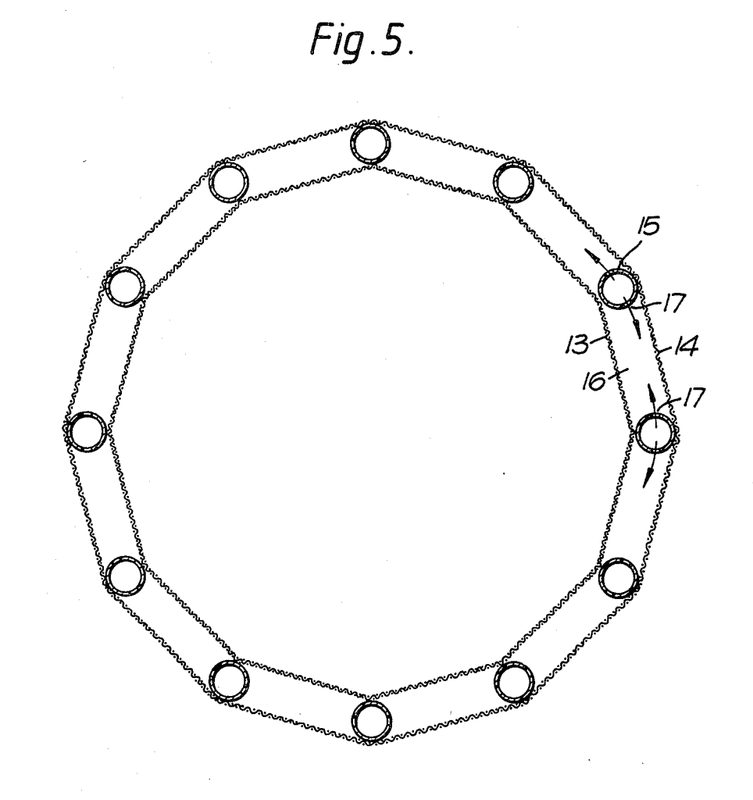
FIG. 5 is a view similar to FIG. 4 showing an alternative arrangement.

In FIG. 5 a less preferred arrangement is shown. Here the catalyst-restraining mesh forms a catalyst-restraining barrier around the interior 13 and exterior 14 surfaces of the squirrel cage arrangement of tubes 15 thus defining an annular catalyst-free space 16 through which all the radially flowing fluid must pass. It will be appreciated that in this embodiment it is not necessary to have an even number of tubes 15. Each tube 15 has a series of perforations 17 along its length to inject fluid into the portion of the annular space 16 on either side of the tube 15. As mentioned above, the disadvantage of this construction is the inability of the catalyst particles to move from the catalyst bed within the squirrel cage to that external to the squirrel cage, or vice versa, and so on compensation for variation in bed height due to settlement can occur.

Figure 6:
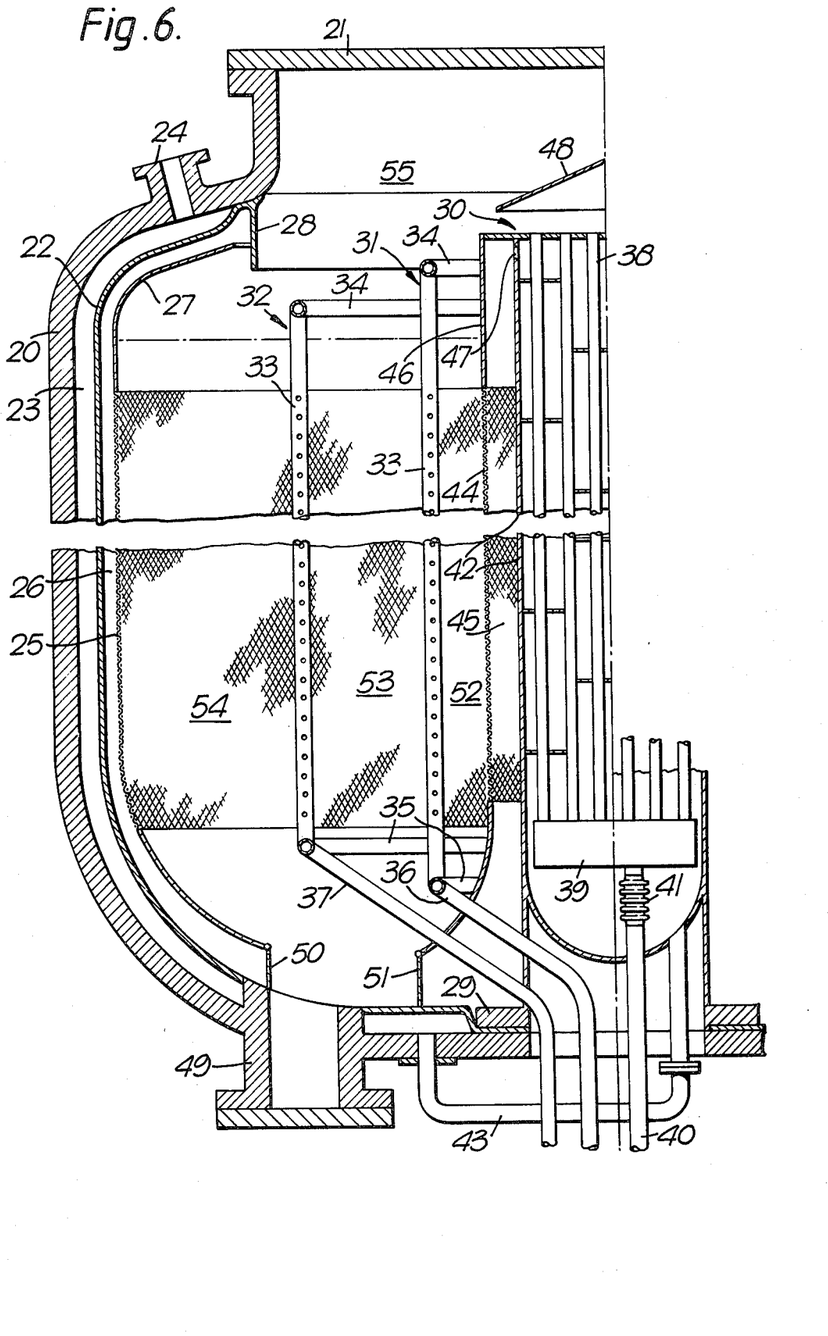
FIG. 6 is a longitudinal section of a radial flow converter incorporating a pair of fluid injector assemblies of the type shown in FIG. 4.

In FIG. 6 a radial-flow converter is shown employing two fluid injector arrangements of the type shown in FIG. 4. The converter comprises a generally cylindrical pressure vessel 20 provided with a lid 21 seated thereto in a gas-tight manner. Within vessel 20 is a shell 22 sealed at its top and bottom to the wall of vessel 20 thus providing an annular space 23 between the wall of vessel 20 and shell 22. A port 24 is provided for introducing gas into the annular space 23.

Within shell 22 is an outer catalyst restraining mesh 25 to provide an annular zone 26 between the catalyst bed and the shell 22. An upwards imperforate extension 27 to mesh 25 is provided terminating just short of a skirt 28 downwardly dependant from shell 22 to below the top of the extension 27.

Attached at its base 29 to the vessel 20 is an assembly comprising a heat exchanger 30 and a pair 31, 32 of fluid injection arrangements each of the squirrel cage-type shown in FIG. 4. Each squirrel cage arrangement comprises a plurality of pairs of tubes 33 connected at their tops and bottoms by annular tubes 34, 35. Fluid feed pipes 36, 37 are provided to supply fluid to the interior of the tubes of fluid injection arrangements 31, 32 respectively. Each pair of tubes 33 supports a catalyst-restraining mesh (not shown in FIG. 6) enclosing a catalyst-free space between the adjacent tubes of the pair.

The heat exchanger 30 is of conventional construction and comprises a plurality of vertical tubes 38 open at their top to the interior of the vessel 20 and connected at their bottoms to a floating header vessel 39 which in turn is connected to an outlet pipe 40 via a bellows 41. Surrounding the tubes 38 is a baffled enclosure 42 to which inlet gas is supplied, from the annular space 23 between the shell 22 and the wall of vessel 20, via a pipe 43. Surrounding enclosure 42 is an inner catalyst-restraining mesh 44 forming a catalyst-free zone 45 between enclosure 42 and mesh 44. An upwards imperforate extension 46 to mesh 44 is provided sealed to the top of enclosure 42. Gas can flow from the interior of enclosure 42 into zone 45 via holes 47 near the top of enclosure 42.

A conical hat 48 is mounted above heat exchanger 30 to prevent catalyst entering tubes 38 during charging of catalyst into vessel 20 through lid 21. The skirt 28 serves a similar purpose stopping catalyst entering annular space 26 during charging of the catalyst.

Catalyst is charged to fill the space between the outer and inner catalyst-restraining meshes 25 and 44 respectively to a level part way up the extensions 27 and 46 of meshes 25 and 44. The upper parts of tubes 33 of the squirrel cage arrangements 31, 32 are also imperforate so that gas is injected from tubes 33 into the gas stream flowing through the catalyst bed only at levels within the catalyst bed.

Located at the base of vessel 20 are catalyst discharge ports 49 through which the catalyst in the vessel can be drained. Flaps doors 50, 51 are arranged at the base of the catalyst-restraining meshes 25, 44 to enable any catalyst fines that have passed through the meshes 25 and 44 into zones 26 and 45 respectively to be drained away during catalyst discharge. The meshes 25 and 44 are each inclined slightly from the vertical towards each other to permit catalyst fines to drop to the bottom of zones 26 and 45.

The converter has in effect three catalyst beds. Firstly an inner bed 52 between mesh 44 and the inner squirrel cage arrangement 31, an intermediate bed 53 between the two squirrel cage arrangements and an outer bed 54 between the outer squirrel cage arrangement 32 and mesh 25.

In operation gas is fed to the vessel 20 via inlet port 24, down annular space 23, to pipe 43 and thence into the enclosure 42 of the heat exchanger 30. The heated inlet gas flows, via holes 47 into zone 45 and thence radially outwards through mesh 44 into the inner catalyst bed 52. Cold gas is injected, via pipe 36, into the partially reacted gas as it passes through the catalyst-free spaces of the inner squirrel cage arrangement 31 into intermediate bed 53. Likewise further cold gas is injected, via pipe 37, as the partially reacted gas passes through the second squirrel cage arrangement 32 into the outer bed 54. The gas leaving bed 54 passes through mesh 25 into annular zone 26 where it effects some heat exchange through the shell 22 with the incoming gas in annular space 23. The reacted gas then passes past extension 27 of mesh 25, and skirt 28, into the space 55 above the catalyst beds, under the hat 48 into the heat exchanger tubes 38 where further heat exchange is effected with the inlet gas flowing up baffled enclosure 42. The reacted gas then passes, via header 39 to the outlet pipe 40.

One factor that has limited vessel size, and hence reactor capacity, heretofore has been the difficulty in obtaining a gas tight pressure seal between the lid and the vessel. As the lid diameter increases these problems increase and the lid and vessel are required to be of increasingly massive construction to obtain a satisfactory seal. With axial-flow reactors the lid diameter has had to be virtually equal to the vessel diameter to permit removal of the lozenges. It is seen that with a radial-flow reactor, the lid diameter can be considerably less than that of the vessel and yet the squirrel cage structures, and heat exchanger, can be removed through the lid as a single unit.

I claim:

1. In a catalytic converter of the type having a catalyst bed through which a first fluid may pass and within which catalyst bed there is provided one or more catalyst-free enclosures provided with injection means so that, during its passage through the catalyst bed a substantial proportion of the first fluid passes through said one or more catalyst-free enclosures and mixes therein with a second fluid, or a further quantity of said first fluid, introduced into said enclosure or enclosures via said injection means, the improvement wherein:
   (a) the converter is of the transverse flow type
   (b) each of said one or more catalyst-free enclosures comprises:
      (i), two tubes disposed substantially parallel to one another and extending along the length of the converter through substantially the whole depth of the catalyst bed,
      (ii) a perforate catalyst restraining means, supported by the tubes, forming a cage enclosing the space between the tubes, and
   (c) said injection means comprises:
      (iii) means to supply said second fluid, or said further quantity of the first fluid, into the interior of each tube, and
      (iv) a series of perforations along the length of each tube connecting the tube interior with said enclosed space.

2. In a catalytic converter according to claim 1, the improvement wherein:
   the converter is of the radial flow type, and
   there is at least one set of said catalyst-free enclosures, each set
      (i) having a plurality of said catalyst-free enclosures and
      (ii) comprising a plurality of said tubes arranged in a cylindrical ring-like pattern substantially co-axial with the longitudinal axis of the converter and each catalyst-free enclosure in said set is defined by adjacent tubes of said pattern and perforate catalyst restraining means enclosing the space between those adjacent tubes.

3. A catalytic converter according to claim 2, wherein:
   there is an even number of said tubes in said cylindrical ring-like pattern so that said pattern has a plurality of pairs of adjacent tubes, and
   each catalyst-free enclosure in said set comprises a pair of adjacent tubes and perforate catalyst restraining means enclosing the space between the tubes of that pair,
   the improvement wherein
   there is no catalyst restraining means between adjacent pairs of tubes.

4. A catalytic converter, comprising:
   means defining a catalyst bed constructed and arranged to have a stream of fluid passed transversely therethrough;
   said perforate catalyst-restraining means circumscribing said set and a radially inner portion of said perforate catalyst-restraining means being circumscribed by said set, thereby forming an annular cage containing all of said tubes in said set.

5. The catalytic converter of claim 4, wherein:
   said transverse flow type catalytic converter is of radial flow type to provide for radial coursing of said stream of fluid across said catalyst bed;
   said at least two tubes being constituted by a plurality of tubes arranged in at least one cylindrical ring-like pattern containing more than two said tubes.

6. The catalytic converter of claim 5, wherein:
   said tubes in at least one said pattern are arranged in pairs of two angularly neighboring tubes each supporting a respective portion of said perforate catalyst-restraining means and forming a respective said cage.

7. The catalytic converter of claim 5, wherein:
   said tubes in at least one said pattern are arranged in a circumferentially extending set with a radially outer portion of
   at least two tubes disposed substantially parallel to one another and extending along the length of the converter through substantially the whole depth of the catalyst bed;

a perforate catalyst-restraining means supported by at least some of said tubes and forming at least one cage enclosing a respective space between said tubes, said at least one cage being constructed and arranged to have at least a substantial portion of said stream of fluid passed therethrough in the course of passage of said stream of fluid through said catalyst bed means;

means defining perforations communicating through said tubes with said enclosed space, each said cage thereby defining a respective catalyst-free enclosure into which a fluid to be joined with said stream of fluid may be injected from the respective said at least two tubes via said perforation means.

* * * * *

UNITED STATES PATENT AND TRADEMARK OFFICE
CERTIFICATE OF CORRECTION

PATENT NO. : 4,473,600

DATED : September 25, 1984

INVENTOR(S) : Sydney P. S. Andrew

It is certified that error appears in the above-identified patent and that said Letters Patent is hereby corrected as shown below:

Patent claims 4 and 7 should read:

4.  A catalytic converter, comprising:
    means defining a catalyst bed constructed and arranged to have a stream of fluid passed transversely therethrough; at least two tubes disposed substantially parallel to one another and extending along the length of the converter through substantially the whole depth of the catalyst bed;
    a perforate catalyst-restraining means supported by at least some of said tubes and forming at least one cage enclosing a respective space between said tubes, said at least one cage being constructed and arranged to have at least a substantial portion of said stream of fluid passed therethrough in the course of passage of said stream of fluid through said catalyst bed means;
    means defining perforations communicating through said tubes with said enclosed space,
    each said cage thereby defining a respective catalyst-free enclosure into which a fluid to be joined with said stream of fluid may be injected from the respective said at least two tubes via said perforation means.

UNITED STATES PATENT AND TRADEMARK OFFICE
CERTIFICATE OF CORRECTION

PATENT NO. : 4,473,600

DATED : September 25, 1984

INVENTOR(S) : Sydney P. S. Andrew

It is certified that error appears in the above-identified patent and that said Letters Patent is hereby corrected as shown below:

7. The catalytic converter of claim 5, wherein:
said tubes in at least one said pattern are arranged in a circumferentially extending set with a radially outer portion of
said perforate catalyst-restraining means circumscribing said set and a radially inner portion of said perforate catalyst-restraining means being circumscribed by said set, thereby forming an annular cage containing all of said tubes in said set.

Signed and Sealed this

Ninth Day of April 1985

[SEAL]

Attest:

DONALD J. QUIGG

Attesting Officer

Acting Commissioner of Patents and Trademarks